(12) United States Patent
Lin

(10) Patent No.: US 6,317,673 B1
(45) Date of Patent: Nov. 13, 2001

(54) ELECTRICAL APPARATUS FOR ASSISTING MECHANICAL BRAKING IN A MOTOR CYCLE

(76) Inventor: Chung-Hsien Lin, No. 142, Hsin Ming Road, Nei Hu District, Taipei (TW)

(*) Notice: Subject to any disclaimer, the term of this patent is extended or adjusted under 35 U.S.C. 154(b) by 0 days.

(21) Appl. No.: 09/330,778

(22) Filed: Jun. 11, 1999

(51) Int. Cl.$^7$ ............................. G06F 19/00; G06F 7/70; G06G 7/00
(52) U.S. Cl. ............................. 701/70; 74/523; 74/524; 74/502.2; 318/375; 318/376; 318/759; 318/369
(58) Field of Search ................................. 701/70; 74/489, 74/523, 524, 502.2; 318/434, 432, 471, 362, 369, 375–376, 759

(56) References Cited

U.S. PATENT DOCUMENTS

| | | | |
|---|---|---|---|
| 4,626,042 | * | 12/1986 | Burckhardt ............................. 303/106 |
| 5,341,077 | * | 8/1994 | Chen et al. ............................. 318/434 |
| 5,384,522 | * | 1/1995 | Toriyama et al. ..................... 318/371 |
| 5,519,294 | * | 5/1996 | Chen et al. ............................. 318/432 |
| 5,644,202 | * | 7/1997 | Toriyama et al. ..................... 318/369 |
| 5,775,173 | * | 7/1998 | Wagner ................................. 74/502.2 |
| 6,011,378 | * | 1/2000 | Tabata et al. ......................... 318/759 |
| 6,047,611 | * | 4/2000 | Warren et al. ........................ 74/489 |

\* cited by examiner

*Primary Examiner*—William A. Cuchlinski, Jr.
*Assistant Examiner*—Ronnie Mancho
(74) *Attorney, Agent, or Firm*—Quarles & Brady LLP

(57) ABSTRACT

A third braking system for an electric motorcycle includes a circuiting apparatus and a mechanism. By depressing an electric-braking button on a switch part of a handle set, a braking signal will be generated and be sent to a signal transformer via an input device of the circuiting apparatus. The signal transformer transforms the braking signal into a digital signal, and then the digital signal is sent to a CPU. After processing the digital signal and detecting the voltage level at a variable resistor, the CPU stops the transmission of driving signals to a driving circuitry for disabling the operation of a speed-control handler of the mechanism, and the CPU also generates a reverse electric potential corresponding to the detected voltage level. The reverse electric potential is then applied to a DC motor via a braking circuitry, for reducing rotation speed of the DC motor to stop the motorcycle. To relieve the braking, the speed-control handler is rotated back to an original state. By re-rotating the speed-control handler to adjust the voltage level of the variable resistor, the DC motor will re-start to drive the motorcycle forward.

3 Claims, 4 Drawing Sheets

ELECTRICAL APPARATUS FOR ASSISTING MECHANICAL BRAKING IN A MOTOR CYCLE

BACKGROUND OF THE INVENTION

1. Field of the Invention

The invention relates to a braking system for an electric motorcycle, in which, by utilizing a circuiting apparatus, a reverse electric potential for braking a driving DC motor is generated by detecting and calculating a voltage level signal at a variable resistor.

2. Description of the Prior Art

In the art of motorcycles, braking systems generally can be divided into two types; one is a drum-type braking system, and another is a disc-type braking system. Both types of braking systems usually perform well under normal road conditions. However, in the case of riding on a steep mountain road or at a strict descending road, both types of braking system may be over operated and encounter problems in lining burnout or disc distortion due to overheating. This is especially true for the drum-type braking system, which when facing an operation temperature over 160° F., will experience deformation of the plastic rim of the drum and the braking capacity thereof will thus be substantially reduced. Hence, as a consequence, the overheating problem will put the rider in jeopardy. Another disadvantage in the conventional braking system is that, while applying braking, the motorcycle is braked to a stop by locking-out the wheel. However, most of time, the engine of the motorcycle will still be maintained at a high-duty operation. Without reducing the power of the engine, trying to stop the speeding motorcycle only by mechanical braking is usually ineffective, and it may make the motorcycle uncontrollable, and quite possibly lead to a traffic accident. Though aforesaid problems in conventional braking system are relieved to some extent by introducing an anti-braking system (ABS), yet it is obvious that the problems can't be really and safely resolved by simply applying mechanical braking to the front and/or rear wheel. In particular, the conventional mechanical braking system usually has a maintenance problem.

Generally, safety problems in braking already exist in an ordinary motorcycle having conventional drum-type or disc-type braking system on its front or rear wheel. Regarding the developing electric motorcycle, particularly designed for an environmental conservation purpose, the braking system design still uses the conventional braking system. Therefore, the inherent braking problems in conventional motorcycles are completely applicable to the electric motorcycles. Further, because the electric motorcycle does not contain an engine, no engine braking effect can be provided to the electric motorcycle. Therefore, under an emergency or riding on a strict descending road, in comparison with a conventional motorcycle, a more dangerous situation will be faced by an electric motorcycle by applying only the braking system provided to the front and/or rear wheel.

SUMMARY OF THE INVENTION

Accordingly, in view of insufficient braking capability provided by two braking systems on both wheels of an electric motorcycle, the effort of the present invention is directed to developing a third braking source. The third braking system is particularly aimed at the typical power pattern of the electric motorcycle. In accordance with the present invention, while a rider of an electric motorcycle depresses an electric braking button located on a handle, a circuiting apparatus is provided to generate and send a braking signal from an input device thereof to a signal transformer through cable. Then, the signal transformer will proceed to transform the incoming braking signal into a digital signal, and subsequently forward the digital signal to a CPU. In the CPU, after the digital signal is calculated by a built-in program, the operation of sending a driving signal to a DC motor via a driving circuitry is stopped for the purpose of terminating an acceleration effect provided by a speed-control handler. On the other hand, the CPU will evaluate the voltage level detected at a rotational variable resistor and generate a reverse electric potential sufficient to stop the DC motor. The reverse electric potential then is supplied to the DC motor via a braking circuitry for gradually lowering the running level of the DC motor and finally for stopping the DC motor. Therefore, while the electric motorcycle brakes in an emergency condition or while riding on a strict descending road, the third braking system of the present invention can be applied to assist the braking performed by the conventional mechanical braking systems on both wheels. As a matter of fact, the safety in riding an electric motorcycle can be greatly improved by providing the third braking system of the present invention. As long as the manually operable speed-control handle is returned to its original position, the third braking system is suddenly released. By applying a speed regulator, the voltage level signal from the variable resistor will be transformed to the digital signal by the signal transformer, and the digital signal is then forwarded to the CPU. After calculation by the CPU, a series of driving pulses will be sent, via the driving circuitry, to the DC motor for running the electric motorcycle forward. Besides the normal operation mentioned above, the speed-control handle is mounted to the handle of the motorcycle, via a spring set. The spring set is there for providing sufficient spring force to automatically return the speed control handle from a depressed position. Under such an arrangement, no special attention is needed on resuming the speed-control handle back to its original position, while repeatedly accelerating and braking.

BRIEF DESCRIPTION OF THE DRAWINGS

The present invention will now be specified with reference to its preferred embodiments illustrated in the drawings, in which.

DESCRIPTION OF THE PREFERRED EMBODIMENT

The invention disclosed herein is directed to circuiting and mechanism of a third braking system for an electric motorcycle. In the following description, numerous details are set forth in order to provide a thorough understanding of the present invention. It will be appreciated by one skilled in the art that variations of these specific details are possible while still achieving the results of the present invention. In other instances, well-known components are not described in detail in order not to unnecessarily obscure the present invention.

Figure 1:
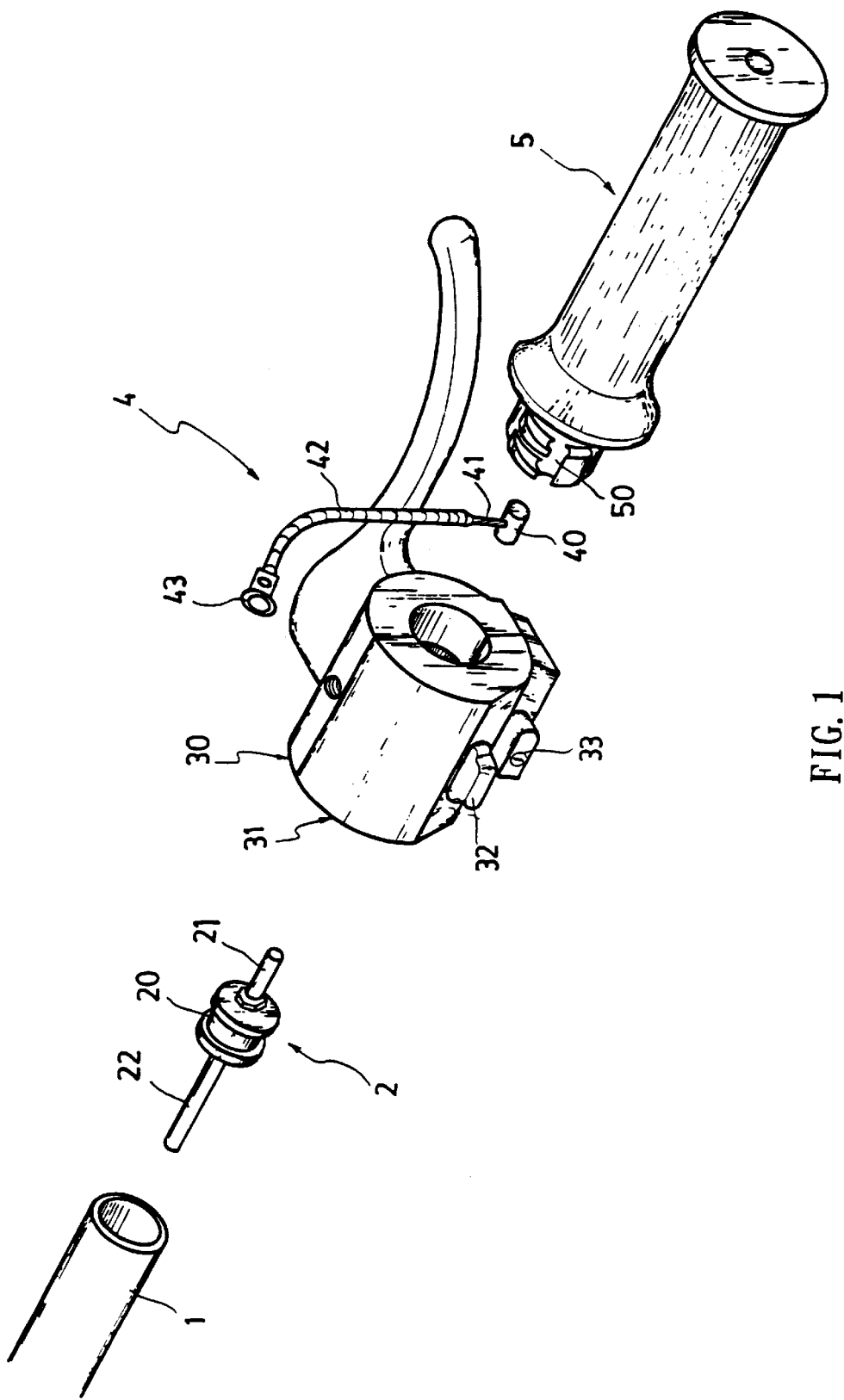
FIG. 1 is a perspective exploded view of a third braking system in accordance with the present invention.
Figure 2:
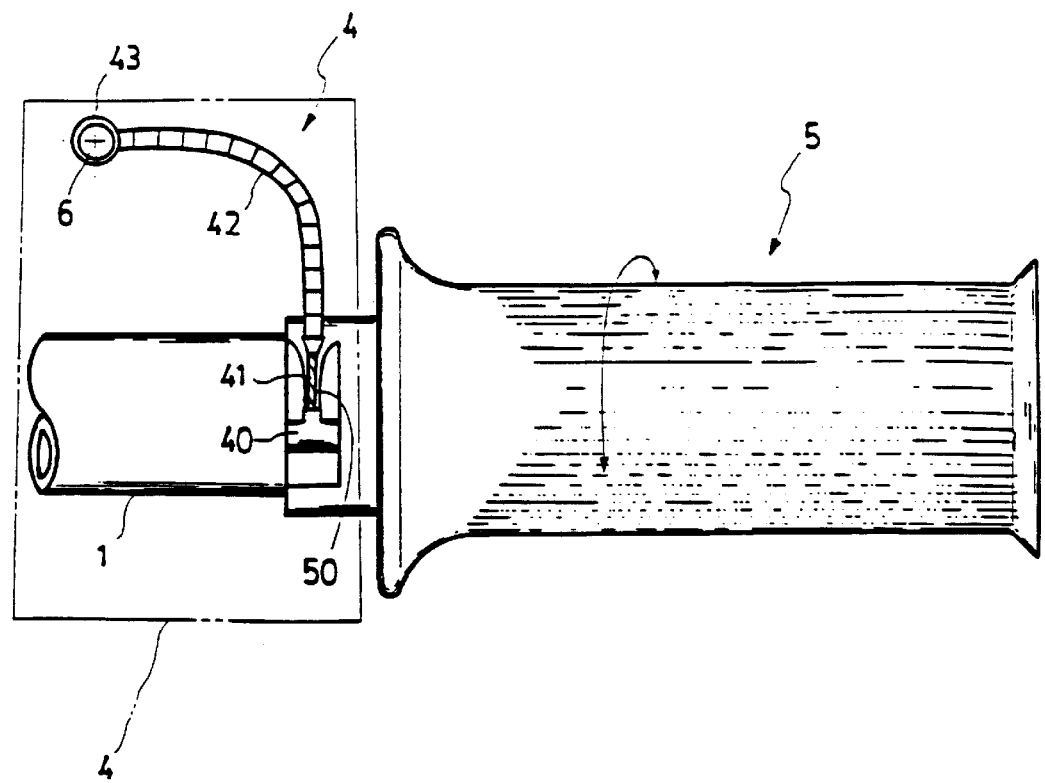
FIG. 2 shows the operational relationship between a spring set and a speed-control handle of the third braking system in accordance with the present invention.
Figure 3:
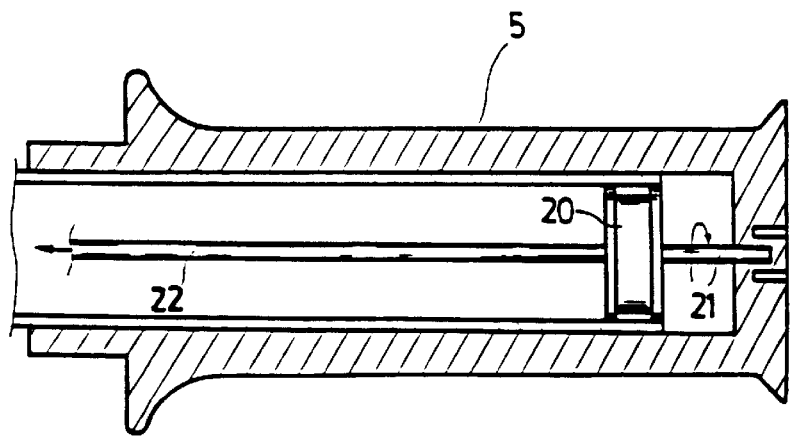
FIG. 3 is a cross-sectional view of a variable resistor and the engaged speed-control handle of the third braking system in accordance with the present invention.

Referring now to FIG. 1 to FIG.3, the third braking system of the present invention is shown to comprise a circuiting apparatus and a mechanism. The mechanism, constructed on a handlebar pipe 1 of a motorcycle, includes a variable resistor 2 planted inside the handlebar pipe 1 via a carrier 20. The carrier 20 has at one end thereof a protruding regulator 21 extended outside the handlebar pipe 1. At another end of the carrier 20, i.e. the end inside the handlebar pipe 1, a signal line 22 is connected with. The mechanism of the present invention includes a handle set 3, further having a switch part 30 and a brake-control part 31. The switch part 30 has thereon a headlight switch 32 and an electric-braking button 33. The mechanism of the present invention further includes a spring set 4, having a stopper 40 at one end and an ear hole 43 at another end. In the spring set 4, the stopper 40 is connected with the ear hole 43 through a cable 41 and a connected spring 42. Further, the mechanism of the present invention includes a speed-control handle 5. The speed-control handle 5 has a hollow interior, a friction exterior, a seal end and an opposing open end. Close to the open end, a T-shape groove 50 is located on the speed-control handle 5. The hollow interior of the speed-control handle 5 is used to accommodate a portion of the handling pipe 1, with a free end of the regulator 21 of the variable resistor 2 planted into the seal end of the speed-control handle 5. By providing the stopper 40 and the cable 41 to anchor inside the T-shape groove 50, a portion of the spring set 4 can be installed inside the speed-control handle 5. By providing the ear hole 43 and the spring 42 to be fixed on the handle set 3 via a screw 6, the rest of the spring set 4 can be installed inside the handle set 3. By such an arrangement, the variable resistor 2 can be adjusted by rotating the speed-control handle 5 as well as the regulator 21, which rotates with the speed-control handle 5. By providing the spring set 4, a return spring force can be provided to automatically return the rotated speed-control handle 5 back to its original state.

Figure 4:
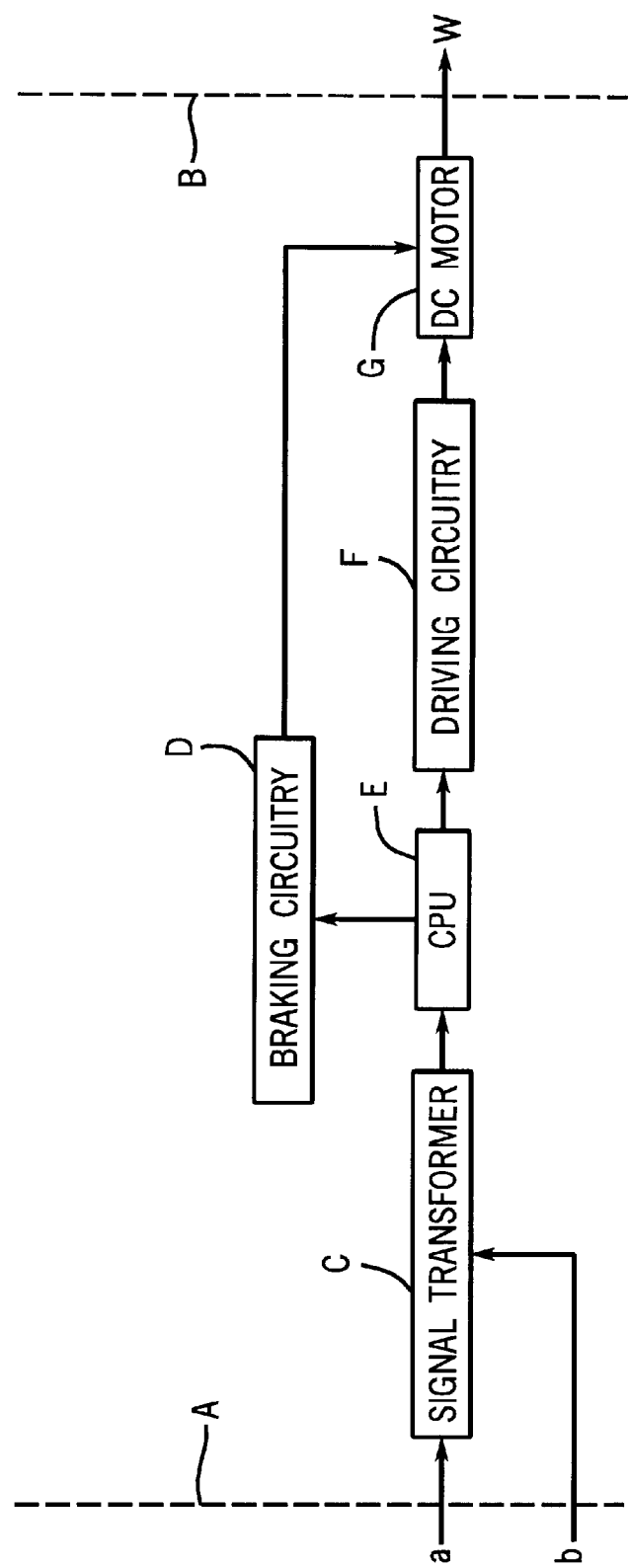
FIG. 4 is a block diagram of the circuiting of the third braking system in accordance with the present invention.
Figure 5:
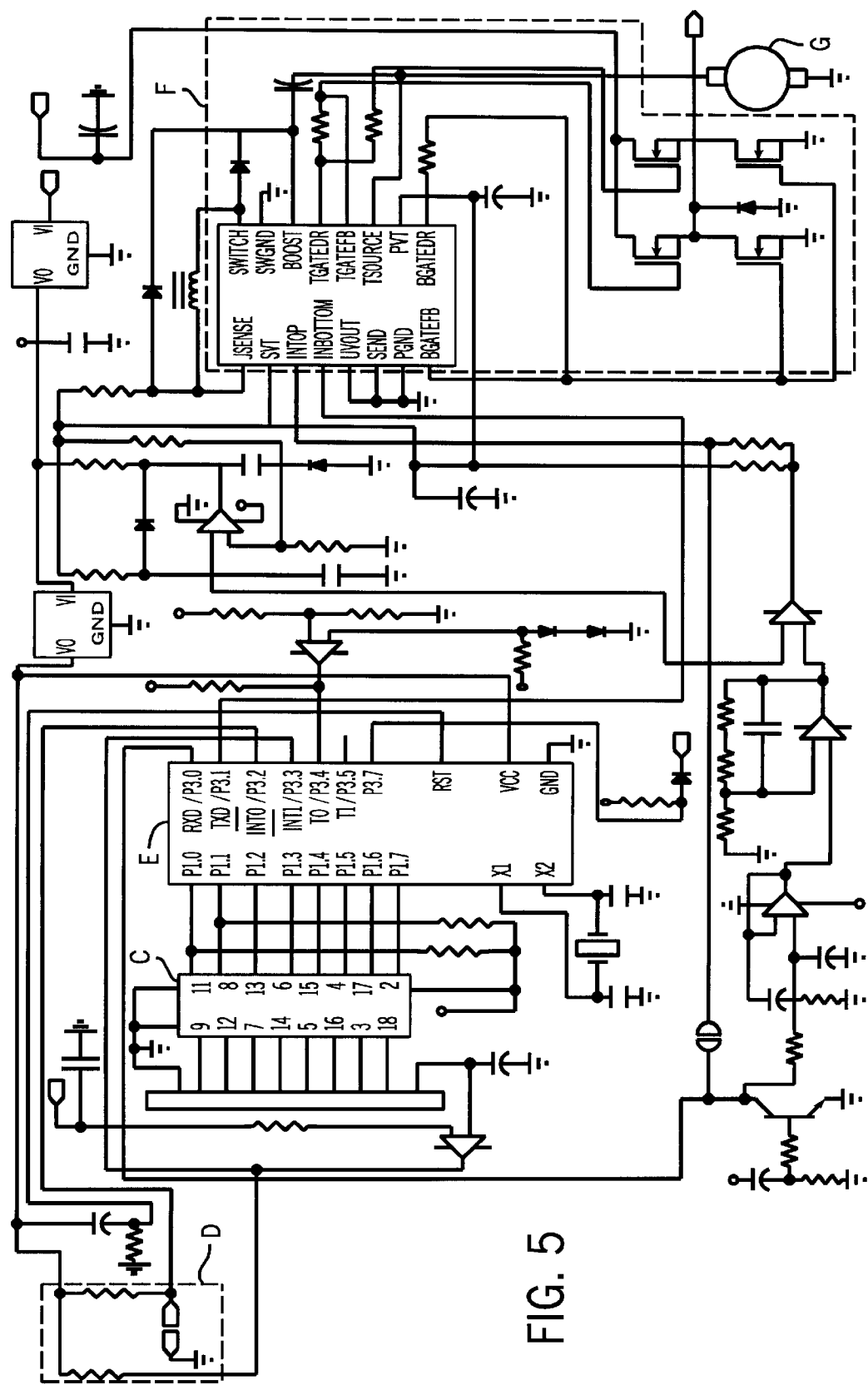
FIG. 5 shows the detail circuiting of the third braking system in accordance with the present invention.

Referring now to FIG. 4 and FIG. 5, a block diagram and a circuiting plot of the present invention are shown, respectively. The third braking system of the present invention includes a signal transformer C, a CPU E, a braking circuitry D, and a driving circuitry F. Under normal operation of the motorcycle, the rider can rotate the speed-control handle 5 to adjust the voltage level of the variable resistor 2. The voltage value a detected at the variable resistor 2 is transferred to the signal transformer C via an input device A, and the signal transformer C then transforms the voltage value into a digital signal. The digital signal then is forwarded to the CPU E. After processing the digital signal, the CPU E generates a series of driving pulse to the driving circuitry F. The digital signal is then amplified at the driving circuitry F and then sent to a DC motor G for inducing a respective electric potential according to the electromagnetic effect. The electric potential is then used to rotate the rear wheel of the motorcycle and to run the motorcycle forward. Upon an emergency in the riding, if the braking systems on the front and the rear wheels cannot provide sufficient braking for suddenly stopping the motorcycle (for example, in a ride along a strict descending road), the rider can depress the electric-braking button 33 on the handle set 3 to generate a braking signal b. The braking signal b is transferred to the signal transformer C via the input device A, and the signal transformer C then transforms the braking signal into a digital signal. The digital signal then is forwarded to the CPU E. After processing the digital signal, the CPU E stops the electric communication between the driving circuitry F and the DC motor G, and also the CPU E generates a reverse electric potential, by a stored program, to account for the current voltage level detected at the variable resistor. The reverse electric potential is then applied to the DC motor G. By such an arrangement, the DC motor G will not accept driving signals from the driving circuitry F, and running of the DC motor G will be decreased level-wise to stop in a short time. Though the electric braking operation can be completed suddenly, yet the DC motor G cannot be immediately stopped. As a positive effect, the wheel then won't meet a lockout situation, so that a dangerous forward inclination of the motorcycle due to a sudden stop can be avoided. To release the third braking system, the rider needs to rotate again the speed-control handle 5, which has been resumed to its original state by the spring set 4. By rotating the speed-control handle 5, the variable resistor 2 will generate a series of respective voltage values to the CPU E, via the input device A. Then, the CPU E will process the voltage values and generate corresponding signals to terminate the operation of the braking circuitry D. Also, the driving circuitry F resumes to issue driving signals for running the motorcycle forward.

By providing the third braking system in accordance with the present invention, users can have another braking option other the conventional braking system installed at the front and the rear wheels. Thereby, more safety and ensured braking capability can be provided to the electric motorcycle.

While the present invention has been particularly shown and described with reference to preferred embodiments, it will be understood by those skilled in the art that various changes in form and detail may be without departing from the spirit and scope of the present invention.

I claim:

1. A circuiting apparatus for supplementing a mechanical braking system on a motorcycle, the circuiting apparatus being installable on the motorcycle with a DC motor, and the circuiting apparatus comprising:

a manually operable braking control mounted on the motorcycle for generating braking control signals;

a manually operable speed control mounted on the motorcycle for generating speed control signals and for automatic return to an initial position when released;

a signal transformer, for transforming the speed control signals from the speed control and the braking signals from the braking control into digital signals, wherein the speed control signals are detected in response to a position of a variable resistor and wherein the braking signals are provided in response to operation of an electric-braking button;

driving circuitry for generating control signals to control a speed of the DC motor;

braking circuitry, for controlling a reverse electric potential applied to the DC motor; and a CPU, for receiving the digital signals from the signal transformer, for processing the digital signals corresponding to the speed control signals to drive a driving circuitry that transmits a series of driving pulses for producing an electric potential to run a DC motor, and for processing digital signals corresponding to the braking signals to drive the braking circuitry for generating reverse electric potential signals to stop the DC motor.

2. A mechanism of a third braking system for an electric motorcycle, comprising:

a variable resistor, positioned inside one end of a handlebar pipe, having a regulator at one end thereof to protrude outside the end of the handlebar pipe, and having a signal cable at another end to connect with a circuiting apparatus through inside of the handlebar pipe;

a handle set, having thereon a switch part and a braking part, and the switch part further having thereof a headlight switch and an electric-braking button;

a spring set, having thereof a stopper at one end and an ear hole at another end, and the stopper connecting with the ear hole through a cable and an engaged spring; and a speed-control handle, having a hollow interior, a frictional exterior surface for gripping, a sealed end, an opposing open end and an external T-shape groove located adjacent to the open end;

wherein the hollow interior of the speed-control handle accommodating a portion of the handlebar pipe with a free end of the regulator of the variable resistor positioned within the sealed end of the speed-control handler, a portion of the spring set being installed inside the speed-control handle by anchoring the stopper and the cable into the T-shape groove, and rest of the spring set installed inside the handle set by fastening the ear hole and the spring onto the handle set; and while rotating the speed-control handle to co-rotate the regulator of the variable resistor for adjusting the voltage level of the variable resistor, the voltage level then being transmitted to the circuiting apparatus, the circuiting apparatus then generating signals to a DC motor for driving the motorcycle forward or for reducing rotation speed of the DC motor to stop the motorcycle.

3. The mechanism of claim 2, wherein said speed-control handle is rotated again after resuming an original state to cause a new voltage level to be generated and forwarded to the circuiting apparatus for removing the braking and for re-running the DC motor to drive the motorcycle forward.

* * * * *